Figure 1:
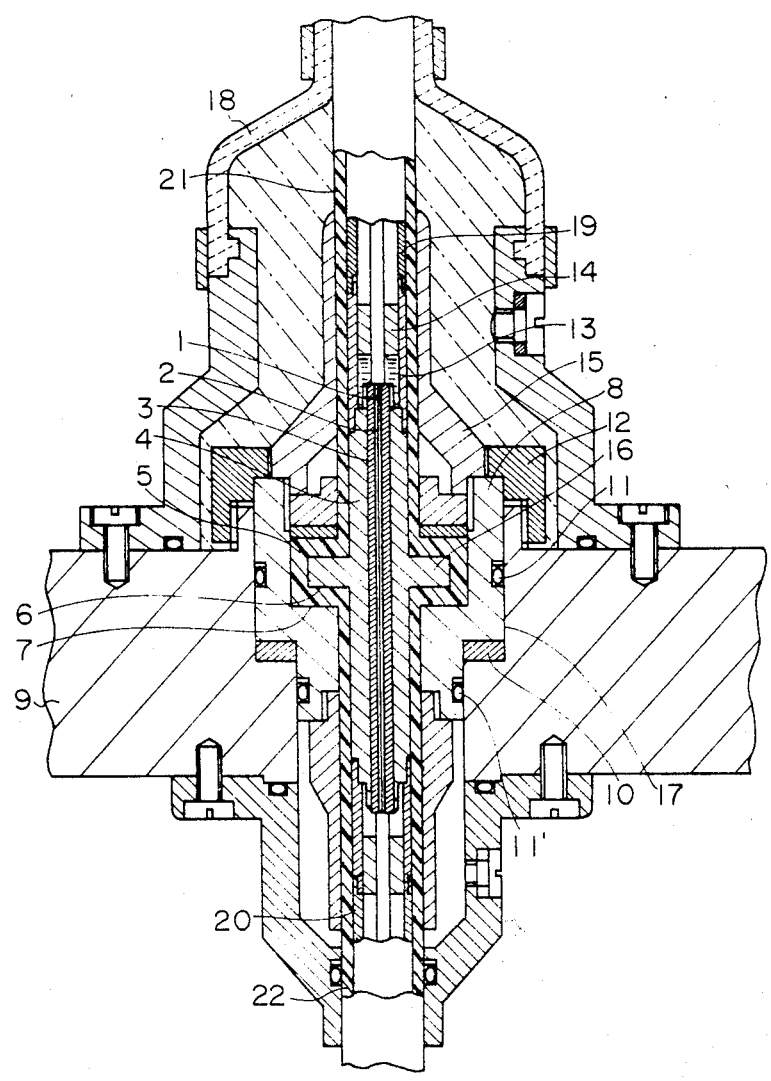

United States Patent [19]
Nakai et al.

[11] 4,295,707
[45] Oct. 20, 1981

[54] FEED THROUGH FOR OPTICAL SUBMERGED REPEATER

[75] Inventors: Taiichiro Nakai, Fujisawa; Kahei Furusawa, Kamifukuoka; Yoshihiro Ejiri, Tokyo, all of Japan

[73] Assignee: Kokusai Denshin Denwa Kabushiki Kaisha, Japan

[21] Appl. No.: 81,466

[22] Filed: Oct. 3, 1979

[30] Foreign Application Priority Data

Oct. 6, 1978 [JP] Japan .................................. 53-122503

[51] Int. Cl.³ ........................... G02B 5/14; H02G 3/00
[52] U.S. Cl. ..................... 350/96.20; 174/705
[58] Field of Search ............... 350/96.20, 96.21, 96.22; 174/18, 153 R, 70 S

[56] References Cited

U.S. PATENT DOCUMENTS

| | | | |
|---|---|---|---|
| 2,894,055 | 7/1959 | Clark et al. | 174/18 X |
| 4,214,809 | 7/1980 | Reh | 350/96.20 |

Primary Examiner—John K. Corbin
Assistant Examiner—Rodney B. Bovernick
Attorney, Agent, or Firm—Robert E. Burns; Emmanuel J. Lobato; Bruce L. Adams

[57] ABSTRACT

A feedthrough for optical submerged repeater, in which a clad part of an optical fiber to be introduced into the feedthrough is given a metal coating; the coated part is inserted into a small-diametered metal pipe to be hermetically fixed between the optical fiber and the small-diametered metal pipe as by soft solder; and the small-diametered metal pipe is inserted into a disc sleeve to hermetically fix them as by brazing. Between the disc sleeve and a metal body housing the disc sleeve, polyethylene is molded for electrical insulation therebetween and for holding air-tightness against seawater, and at the side of the disc sleeve facing toward seawater or at both sides of the disc sleeve, an insulator of the optical fiber cable and polyethylene of the abovesaid molding are molded to be contiguous to each other. The abovementioned metal body is fixedly attached to the end face plate of the pressure resisting casing in a manner to provide an air-tight structure.

4 Claims, 2 Drawing Figures

FEED THROUGH FOR OPTICAL SUBMERGED REPEATER

This invention relates to a feedthrough for an optical submerged repeater.

An optical submarine cable using an optical fiber is laid in as deep a sea as several thousand meters and hence is exposed to a seawater pressure of several hundred atmospheres. In view of this, there has heretofore been proposed such an optical fiber submarine cable structure in which an optical fiber is covered with a pressure resisting layer to prevent the optical fiber from being affected by such high seawater pressure and in which the pressure resisting layer also serves as a power supplying feeder (Japanese Pat. Laid Open No. 99032/76).

The optical fiber is made of quartz, multi-component glass or the like and is fragile mechanically. As a material for a pressure resisting casing of the repeater, use is made of a material highly durable against seawater, for example, stainless steel, beryllium copper alloy or the like. The optical fiber submarine cable is introduced into a repeater circuit housed in the pressure resisting casing of the repeater, by using a feedthrough attached to an end face plate of the pressure resisting casing of the repeater. For introducing the optical fiber and a power supplying feeder into the pressure resisting casing of the repeater under a seawater pressure of several hundred atmospheres, there is required a highly reliable feedthrough which has sufficient hydraulic pressure resisting strength and high degrees of electrical insulation and air-tightness and can be used stably for a long period of time. Further connection of the optical fiber at one place causes a transmission loss which compares to an about 1 km length of the optical fiber; therefore, it is desired to employ such a structure which permits reduction of the number of connections of the optical fiber in the route of the repeater circuit—the feedthrough—the optical submarine cable.

An object of the present invention is to provide a feedthrough for an optical fiber submerged repeater which satisfies the abovesaid requirements.

To achieve the above object, in the present invention, a clad part of an optical fiber to be introduced into the feedthrough is given a metal coating; the coated part is inserted into a small-diametered metal pipe to hermetically fixed between the optical fiber and the small-diametered metal pipe as by soft solder; and the small-diametered metal pipe is inserted into a disc sleeve to hermetically fix them as by brazing. Between the disc sleeve and a metal body housing the disc sleeve, polyethylene is molded for electrical insulation therebetween and for holding air-tightness against seawater, and at the side of the disc sleeve facing toward seawater or at both sides of the disc sleeve, an insulator of the optical fiber cable and polyethylene of the abovesaid molding are molded to be contiguous to each other. The abovementioned metal body is fixedly attached to the end face plate of the pressure resisting casing in a manner to provide an air-tight structure.

The present invention provides, with the abovesaid structure, a highly-reliable feedthrough which enables simultaneous introduction of the power supplying feeder of the optical fiber submarine cable and the optical fiber into the pressure resisting casing of the repeater and which is small in size and simple in construction and requires less number of connections of the optical fiber.

Figure 2:
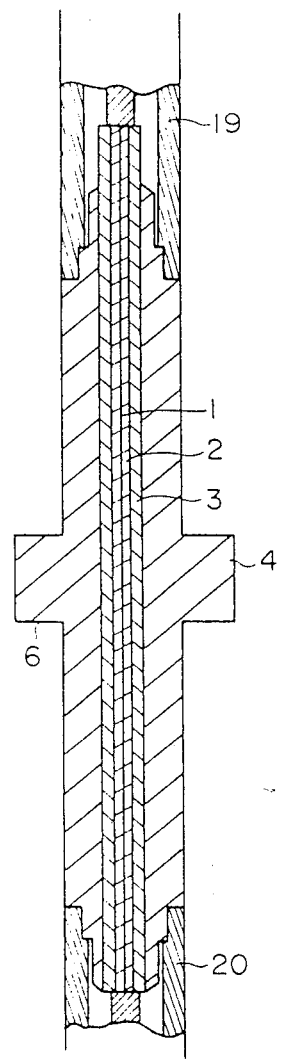

The present invention will hereinafter be described in detail with reference to the accompanying drawing, in which:

FIG. 1 is a longitudinal sectional view illustrating an embodiment of the feedthrough for optical fiber submerged repeater according to this invention; and FIG. 2 is an enlarged longitudinal sectional view showing the main part of the embodiment of FIG. 1.

With reference to FIGS. 1 and 2, an optical fiber 1 is, in itself, low in mechanical strength, and at the introducing part of the feedthrough, the optical fiber 1 must be protected from a thrust due to a high hydraulic pressure. To this end, at the optical fiber introducing part of the feedthrough a clad part of the optical fiber 1 is given a metal coating 2 and is inserted into a small-diametered metal pipe 3 to be fixed therein, whereby to protect the optical fiber 1. The clad part may include a very thin (e.g. several microns) plastic layer coated on the usual glass clad.

In a case of giving the metal coating on the surface of the optical fiber 1, there is a fear of peeling off of the metal coating or lowering of its adhesion due to a difference in expansion coefficient between the metal coating and glass. Accordingly, in a case of coating the optical fiber 1 with a metal in a feedthrough for an optical fiber submerged repeater required to possess high reliability, sufficient consideration must be paid to this problem. The present invention employs a structure and a method by which the metal coating can firmly be deposited, with high reliability, on the clad part of the optical fiber consisting principally of glass.

In the present invention, for example, a liquid having dissolved therein a metal hard to be oxidized, such as silver, platinum or the like, is applied to the clad part of the optical fiber 1, and gold, platinum or like metal is baked on the clad part of the optical fiber to form a primary coating of gold, platinum or like metal on the surface of the clad part, and then copper or like is plated as a secondary coating on the primary coating.

The optical fiber 1 thus given the metal coating 2 is inserted into the small-diametered metal pipe 3, and the metal coating 2 and the small-diametered metal pipe 3 are hermetically fixed together by pouring soft solder into the gap therebetween. In this case, since gold, platinum or the like which is the primary coating of the optical fiber 1 is covered with the plated layer of copper or the like which is the secondary coating, it is possible to prevent diffusion of gold or platinum into the soft solder, thus permitting firm brazing. By forming the optical fiber 1 as a unitary structure with the small-diametered metal pipe 3 as described above, its mechanical strength is increased, allowing ease in subsequent handling of the optical fiber 1 and fabrication of the feedthrough. Further, an extra length (several meters) is provided in the optical fiber extending out from the repeater for connection with an optical fiber of an external cable. The soft solder well wets with plating of copper or the like, and even if the gap between the metal coating 2 of the optical fiber 1 and the small-diametered metal pipe 3 is very small, the soft solder sufficiently runs into the space to ensure joining them over the entire length of the pipe, therefore, if the length of the pipe is made longer than at least several millimeters, it is possible to achieve the strength large enough to withstand a thrust resulting from as high a seawater pressure as several hundred atmospheres and to obtain sufficient air-tightness.

The optical fiber 1 is covered with the small-diametered metal pipe 3 for reinforcement and inserted into the disc sleeve 4 and then fixed by brazing or adhesion. This brazing may also be achieved simultaneously with brazing of the metal coating 2 of the optical fiber 1 to the small-diametered metal pipe 3. By inserting the sleeve 4 into the metal body 8 and by molding polyethylene 5 therebetween, the disc sleeve 4 enclosing the optical fiber 1 is insulated from the metal body 8. Further, by effecting adhesive molding at a part 6 of the disc sleeve 4 and a part 7 of the metal body 8 for joining together the polyethylene 5 and the metal parts 6 and 7, it is possible to prevent vapor or the like from entering along the gap between the polyethylene 5 and the metal body 8 or the disc sleeve 4. Further, polyethylene is molded in the state in which feeders 19 and 20 of the optical fiber cable and the disc sleeve 4 are electrically interconnected at both sides of the metal body 8 and in which polyethylene 21 and 22 serving as an insulator of the cable and the polyethylene 5 of the aforesaid molding are contiguous to each other.

The strength of a disc 16 of the disc sleeve 4 can well withstand a thrust of the optical fiber introducing part due to hydraulic pressure. The metal body 8 thus assembled is inserted into a hole 17 made in an end face plate 9 of the pressure resisting casing and fixed by fastening nuts 12. Between the end face plate 9 and the metal body 8 are disposed a gasket 10 and O rings 11 and 11' to provide a high degree of air-tightness. It is also possible to achieve air-tightness between the end face plate 9 and the metal body 8 by a cone seal method in which conical metal surfaces are firmly urged against each other. In order to protect the cable introducing part from bending or a like external force other than hydraulic pressure and from seawater, a liquid of polyisobutylene or the like may also be filled between a protector 15 and a bellows 18.

Further, coupling of the optical fiber 1 with a light emitting device such as a laser diode LD, a light emitting diode LED or the like, or an avalanche photo diode APD incurs larger coupling loss than the interconnection of optical fibers 1; but, by changing the order of manufacturing steps as described hereunder, use can also be made of an optical fiber 1 coupled beforehand with the light emitting device and the photo detector with low loss.

In the assembling of the feedthrough of the present invention, a first step is to insert the disc sleeve 4 into the metal body 8 and to provide the polyethylene molding 5, assembling the metal body 8 into one part. Then, a sufficient extra length is provided in the optical fiber coupled with a light emitting device and a photo detector of a repeater circuit, and the clad part of the optical fiber 1 disposed in the feedthrough is given the metal coating 2 by the aforementioned method. The coated optical fiber is covered with the small-diametered metal pipe 3 and fixed thereto. The optical fiber inserted into the small-diametered metal pipe 3 is pulled out of the inside of the introducing hole 17 (on the side of the repeater circuit) made in the end face plate 9 of the pressure resisting casing and then inserted into a hole of the disc sleeve 4 enclosed in the metal body 8 and a pressure resisting layer of the optical submarine cable seated at the side of seawater. Thereafter, the small-diametered metal pipe 3 and the disc sleeve 4 are secured together by brazing, and the disc sleeve 4 is connected to a power supplying feeder at the side of the repeater circuit and a power supplying feeder (sometimes used as the pressure resisting layer) of the optical fiber seated at the side of seawater, and then polyethylene is molded so that the insulator of the optical fiber and the polyethylene mold are formed as a unitary structure. Finally, the metal body 8 is fixed by fastening nuts 12 or the like to the end face plate 9 of the pressure resisting casing.

By giving an extra length to the optical fiber as described above, it is possible to easily lead the optical fiber to a desired position passing through the pressure resisting layer of the optical fiber cable, for example, to the vicinity of the coupling position of the optical fiber cable; consequently, the number of connecting points of the optical fiber throughout the optical submerged repeater is two at least, that is, one at each side of the coupling position, permitting economization in terms of transmission characteristic.

In the above embodiment, in a case of a plurality of optical fibers being used, it is also possible to insert and fix them in the small-diametered metal pipe 3. Moreover, a plurality of small-diametered metal pipes 3 having inserted thereto the optical fibers can also be inserted into the disc sleeve 4 having insertion holes of the same number as the pipes and fixed therein.

In a case where an optical fiber submarine cable has more than several pressure resisting layers and these pressure resisting layers are each used as a power supplying feeder, they can also be connected individually to the disc sleeve. For protecting the optical fiber and preventing the brazed part from electrolytic corrosion by seawater entering into the pressure resisting layer due to damage of the cable, it is desirable to fill a liquid 13 of good wettability such as polyisobutylene or the like at the seawater side or both sides of the disc sleeve 4. A packing 4 is provided for leakage of the liquid 13.

The present invention has the following advantages:

(1) By depositing two metal coating layers on a mechanically fragile optical fiber for facilitating brazing, by covering the coated optical fiber with a small-diametered metal pipe and by hermetically fixing them as by brazing, it is possible to impart to the feedthrough structure air-tightness and the mechanical strength large enough to withstand a thrust by a hydraulic pressure applied to the optical fiber.

(2) Since the feedthrough has such a structure into which a power supplying feeder of an optical fiber cable and the optical fiber are introduced together, the area occupied by the cable introducing part on the end face plate is small, resulting in the pressure resisting casing of the repeater being reduced in size.

(3) The power supplying feeder in the feedthrough part is molded by polyethylene together with the insulator of the optical fiber cable; therefore, the power supplying feeder is insulated enough and highly reliable.

(4) Since it is possible to apply the polyethylene molding technique employed in submarine coaxial cables, the feedthrough can easily be manufactured with high reliability.

(5) Since the feedthrough can easily be divided into units, assembling of the feedthrough and the end face plate is easy.

(6) By preparing feedthrough components and by selecting the order of assembling, it is possible to reduce the number of connecting points of the optical fibers an optical submerged repeater to two, namely one at either side of the coupling position of optical fiber cables.

(7) Even if seawater enters into the pressure resisting layer used also as the feeder, due to damage of the cable, there is no fear of corrosion of the brazed part since a chemically stable liquid of good wettability is filled in the brazed part.

What we claim is:

1. In a feedthrough for an optical submerged repeater, which is disposed on an end face plate of the pressure resisting casing of the repeater for introducing an optical fiber and a power supplying feeder of an optical fiber submarine cable into a repeater circuit disposed in the pressure resisting casing of the repeater of an optical fiber submarine cable repeating system, the improvement comprising:

a metal coating deposited on the clad part of at least one optical fiber to be introduced through the feedthrough;

a metal pipe into which said optical fiber deposited with said metal coating is introduced for reinforcement and hermetically fixed therein;

a disc sleeve connected to the power supplying feeder of the optical fiber submarine cable at the outside and inside of the end face plate to form a part of the power supplying feeder and having at least one insertion hole for inserting and air-tightly fixing therein said metal pipe;

a metal body air-tightly fixed to said end face plate for housing therein said disc sleeve; and an insulator layer molded in a gap between said disc sleeve and said metal body and further molded together at at least the seawater side of said disc sleeve.

2. A feedthrough for an optical submerged repeater according to claim 1, wherein the metal coating is composed of a primary metal coating deposited on the clad part of the optical fiber and a secondary metal coating plated on the primary metal coating.

3. A feedthrough for an optical submerged repeater according to claim 1, wherein the power supplying feeder also serves as a pressure resisting layer.

4. A feedthrough for an optical submerged repeater according to claim 3, wherein a seawater preventing member is provided in the pressure resisting layer in the vicinity of the position where the pressure resisting layer and the disc sleeve are interconnected.

* * * * *